Feb. 14, 1961

C. BANCROFT 2,971,500

ROTARY ENGINE

Filed July 28, 1958

INVENTOR.
CHARLES BANCROFT
BY
Kenyon & Kenyon
ATTORNEYS

Feb. 14, 1961

C. BANCROFT 2,971,500

ROTARY ENGINE

Filed July 28, 1958

INVENTOR.
CHARLES BANCROFT
BY
Kenyon & Kenyon
ATTORNEYS

Feb. 14, 1961  C. BANCROFT  2,971,500
ROTARY ENGINE
Filed July 28, 1958  5 Sheets-Sheet 5

INVENTOR.
CHARLES BANCROFT
BY
Kenyon & Kenyon
ATTORNEYS

United States Patent Office 2,971,500
Patented Feb. 14, 1961

2,971,500
ROTARY ENGINE
Charles Bancroft, Ferris Hill Road, New Canaan, Conn.
Filed July 28, 1958, Ser. No. 751,471
18 Claims. (Cl. 123—11)

This invention relates to rotary displacement devices and more particularly to a rotary engine of the alternately accelerating piston type.

Prior art rotary engines of the accelerating piston type have generally handled fluids in a single chamber having mounted therein a plurality of piston sets. It has heretofore been thought impossible to provide a rotary engine of this type with more than one piston chamber in which all the piston sets in the various chambers are driven from a common driving means due to the conflicting motions of the various interacting parts.

The primary object of the present invention is to provide a rotary engine in which the above difficulties are overcome and in which four separate piston sets of the alternately accelerating type are mounted in a partitioned cylinder providing two separate piston channels with two piston sets being rotatively mounted in each channel. The two piston channels provide overlapping power strokes and relatively constant torque. The two piston channels may have common firing chambers with substantially constant firing to avoid the peak pressures commonly associated with reciprocating internal combustion engines or they may have individual firing chambers. For the latter each channel has associated therewith two firing chambers located at diametrically opposed positions resulting in equalized pressures at diametrically opposed positions in the piston channels. If common firing chambers are used there is one firing chamber on each side of the two channels interconnecting these chambers. In this manner all radial loads resulting from internal gas pressures on the rotary piston sets and associated parts are balanced out whether individual or common firing chambers are used.

A further object of the present invention is to provide a rotary engine with two piston channels in which the piston sets in each channel are driven from common driving means consisting of a crankshaft and two connecting members in order to balance out all torsional vibration. The piston sets in each channel are provided with side walls of substantially equal area on both sides of the piston channel thereby substantially balancing out the end pressures on each side of the piston channels. In this manner the longitudinal loads on the rotating pistons and associated parts are substantially balanced out.

Another object of the present invention is to provide a rotary engine with two piston channels in which leakage from or into the piston channels is prevented. This is accomplished by providing sealing rings and labyrinths arranged to trap oil under the influence of centrifugal force and thereby maintain a leakproof seal. The residual pressures remaining after overall longitudinal pressures on the piston assemblies have been substantially balanced out are designed to maintain a constant pressure between the driving rings of adjacent piston assemblies to thereby prevent leakage at these points. Leakage across the pistons is also prevented by a combination of spring loaded sealing strips and residual longitudinal pressures achieved by arrangement of the areas of the side walls of the piston sets so that a positive pressure and seal against leakage is maintained at all points.

Still another object of the present invention is to provide a rotary engine which combines high output for a size and weight approaching that of the internal combustion turbine while providing the high efficiency and relatively low manufacturing cost of the reciprocating engine. The rotary engine of the present invention combines centrifugal force with positive displacement to achieve high output with small size.

These and further objects of the present invention will appear from the following description of a preferred form of the invention to be read in conjunction with the accompanying drawings wherein like components in the different views are designated by the same reference numerals.

Figure 1:
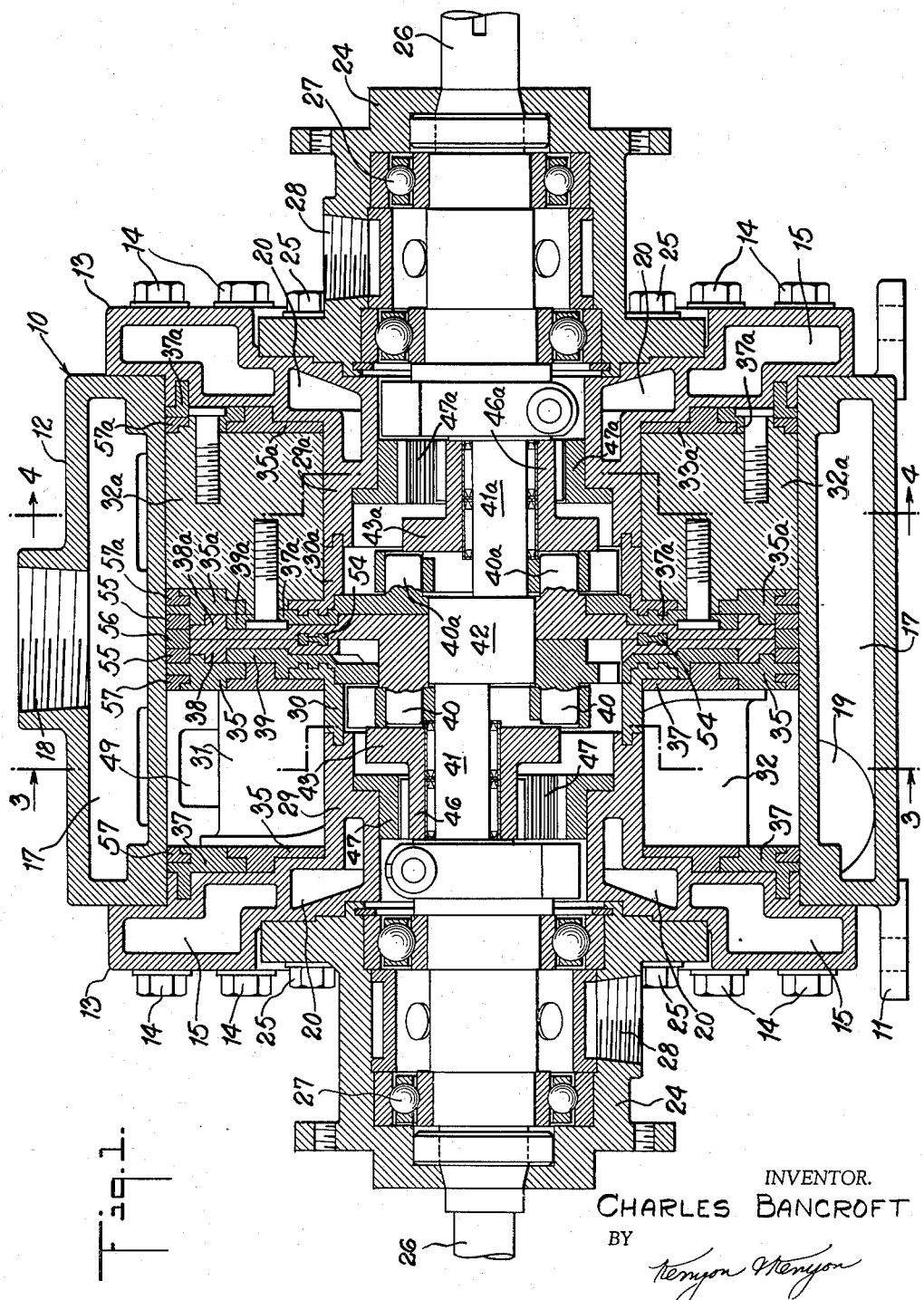
Figure 1 is a longitudinal cross section of the rotary engine of the present invention.

Referring now to the drawings, the stator which is designated in general by the numeral 10 is held against rotation by the base 11. The stator 10 is made up of three main elements, an annular central section 12 mounted on the base 11 and two identical end sections or plates 13 which are joined to the central section 12 by means of bolts 14. The end plates 13 are cored out such as at 15 to provide jackets for the circulation of a cooling fluid. These jackets 15 in the end plates 13 connect through passages 16 with jackets 17 in the central section 12 to thereby facilitate circulation of the cooling fluid throughout the entire stator. The cooling fluid is circulated through the stator 10 via openings 18 and 19 which may be connected to suitable cooling means such as a conventional radiator.

Figure 2:
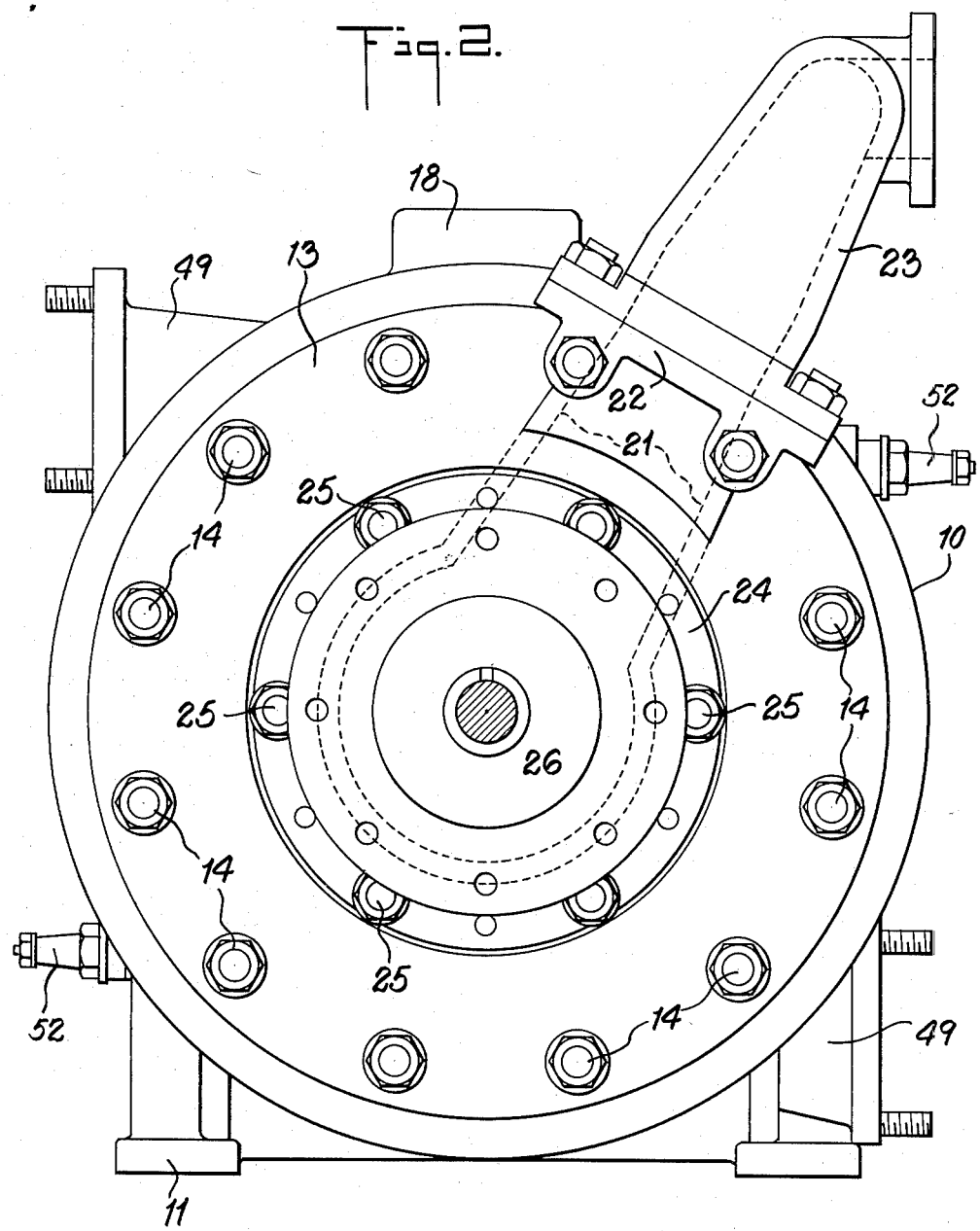
Figure 2 is an end elevation of the rotary engine of the present invention as viewed from the left in Figure 1.

The end plates 13 also have provided therein centrally located intake manifolds 20. These intake manifolds are interconnected by a passage 21 as indicated by the dotted lines in Figure 2. The passages 21 are connected to mounting pad 22 which serves to mount a connecting intake manifold 23 which interconnects the two intake passages 21. The connecting intake manifold 23 is connected to a carburetor or other fluid admission means.

Each of the end plates 13 has secured thereto a nose cap 24 by meaans of bolts 25. The nose caps 24 rotatively support the crankshaft 26, the crankshaft 26 being journaled by bearings 27. Each nose cap 24 is provided with openings 28 which are oil connections to permit the circulation or addition of oil to the interior of the engine of the present invention.

As illustrated in Figure 1, the central section 12 of the stator 10 is divided into two ring chambers. Each of these ring chambers is defined by the inner circumference of the central section 12, the annular extensions 29 of the end plates 13 and annular parts 30 which are bolted to the extension 29. In each ring chamber there are rotatively mounted two identical piston sets designated in general by the numerals 31 and 32. Each of these piston sets include four vane pistons spaced apart 90 degrees, the vanes of these piston sets being identified by the same reference numerals assigned to the piston sets. As will be presently described, the rotation of each piston set is controlled in such a manner that each piston set is alternately locked to the stator and driven at a substantial speed. The rotation of the piston sets in one chamber are timed to the rotation of the piston sets in the other chamber such that the vanes of the piston sets in one ring chamber are at their closest point to one another when the vanes of the piston sets in the other ring chamber are spaced equally apart.

Since the components in the two ring chambers are identical only the structure of the left hand ring chamber in Figure 1 will be described, similar components in the right hand ring chamber being identified by the same reference numeral as in the left hand ring chamber but with the addition of the subscript $a$. The piston set 31 includes four vane pistons and associated segmental side walls 35. The inner segmental side wall 35 on the left is an integral part of each vane 31 and the outer segmental side wall 35 on the right is secured to the vanes 31 by means of bolts. The piston set 32 also includes four vane pistons and associated segmental side walls 37. The inner segmental side wall 37 on the right is an integral part of the vanes 32 and the outer segmental side wall 37 on the left is secured to the vanes 32.

In the right hand ring chamber (Figure 1) piston set 31a has formed integrally with the vanes thereof inner right hand segmental side walls 35a while the left hand outer segmental side walls 35a are secured to the vanes. The piston set 32a also has four piston vanes which are an integral part of left hand outer segmental side walls 37a and have secured thereto the right hand inner segmental side walls 37a.

In each of the four piston sets the inner segmental side walls on one side and the outer segmental side walls on the other side are designed to have substantially the same total surface area. In this manner the longitudinal or lateral thrust on these side walls resulting from pressures in the ring chambers are substantially balanced out.

The piston sets in each channel are connected to driving rings, a total of four driving rings being provided—one for each piston set. The piston sets 31 and 31a are connected respectively to similar driving rings 38 and 38a, while the piston sets 32 and 32a are connected respectively to similar driving rings 39 and 39a. The four driving rings are each provided with two integral crankpins 40 and 40a. The two crankpins 40 on each driving ring are positioned on opposite sides of the driving ring assembly and are spaced 180 degrees apart on the axis of rotation of each driving ring. The crankpins of each driving ring are therefore mounted diametrically opposite each other.

In accordance with the present invention means are provided to ensure that corresponding variations in distance between adjacent piston vanes always occur cyclicly and at the same point about the periphery of the stator 10. These means include crankshaft 26 which has two crankpins 41 and 41a spaced 180 degrees apart and on opposite sides of a central bearing 42 thereby providing a double throw crankshaft. The inner circumference of each of the four driving rings 38, 38a, 39 and 39a are rotatively supported on the central bearing 42 of the crankshaft 26, the engagement between these surfaces being by segmental or slipper-type bearing surfaces. The sum of the segmental bearing surfaces of the four driving rings forms a complete bearing surface for the central bearing 42.

Figure 3:
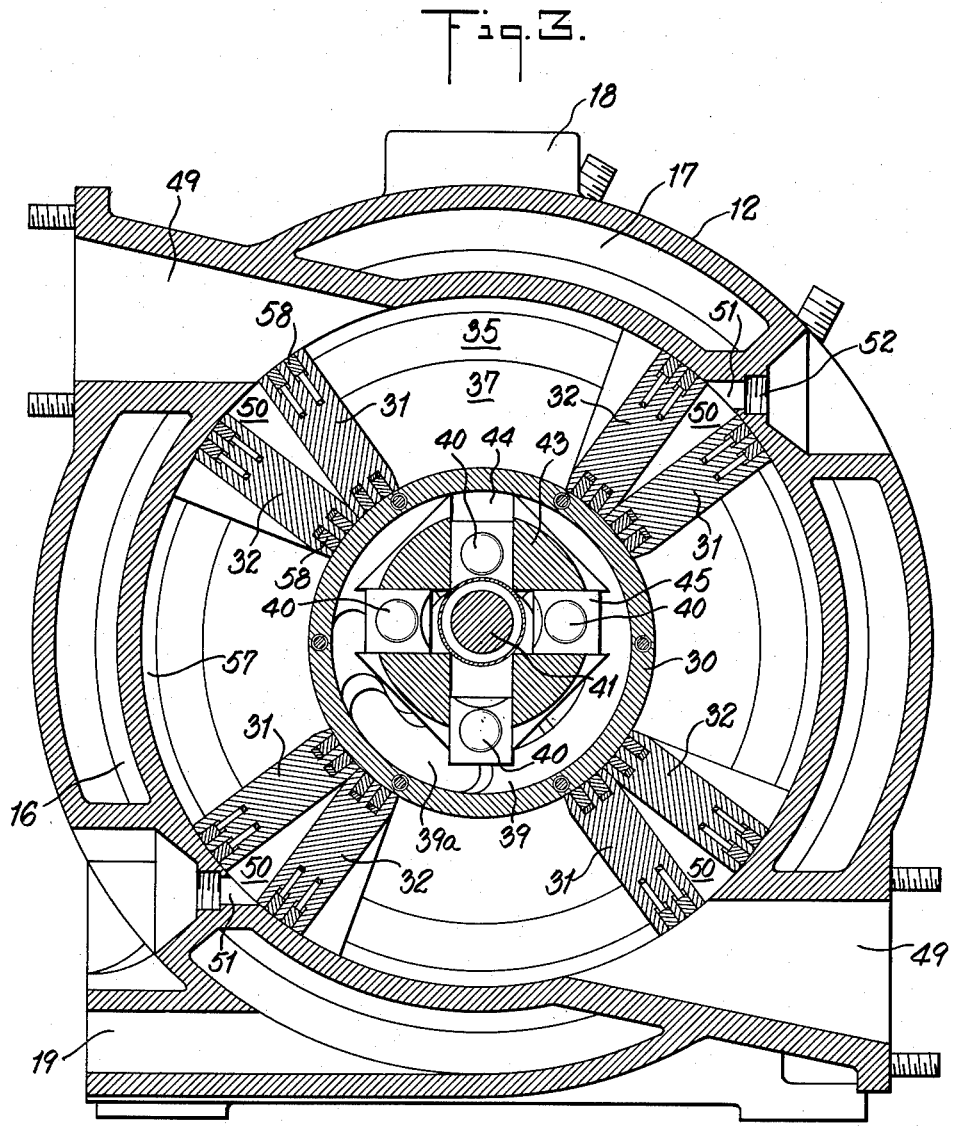
Figure 3 is a cross section taken on the line 3—3 of Figure 1, the section being irregular in order to illustrate structural details of the driving means.
Figure 4:
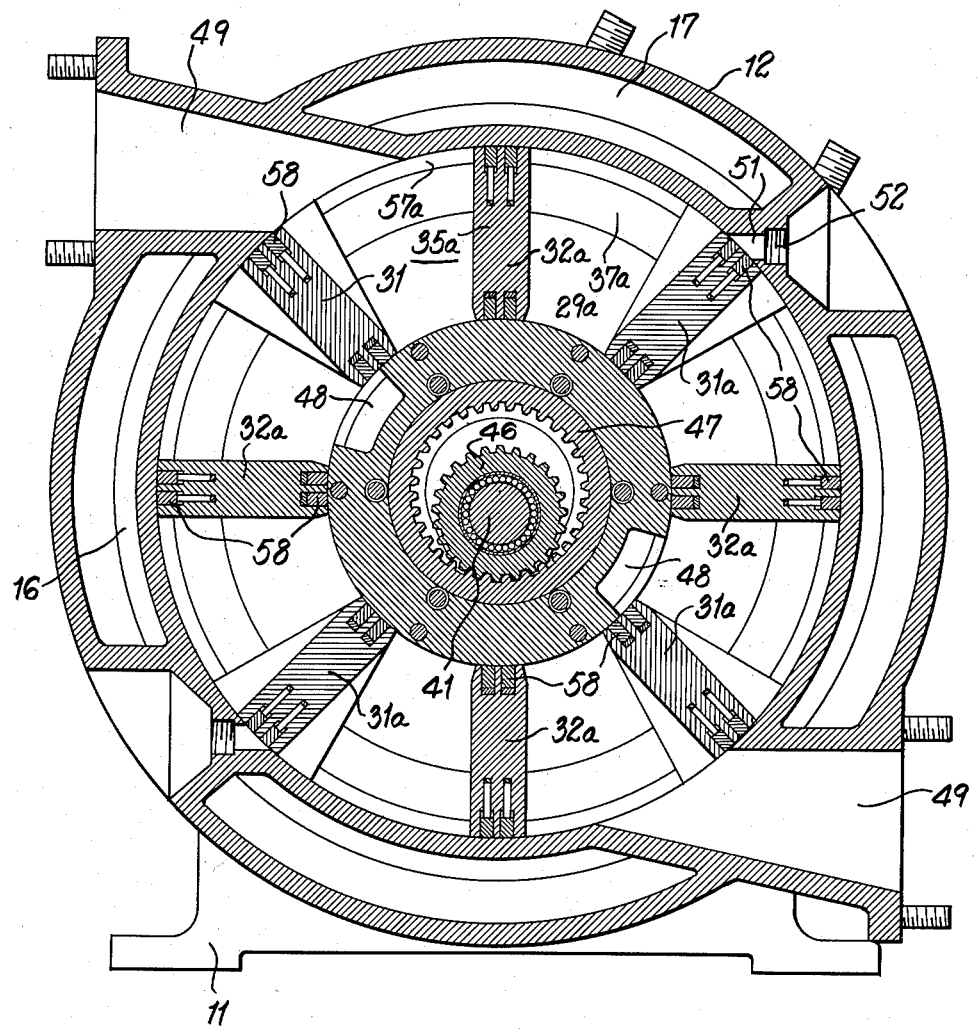
Figure 4 is a cross section taken on the line 4—4 of Figure 1, the section being irregular in order to illustrate structural details of the driving means.
Figure 5:
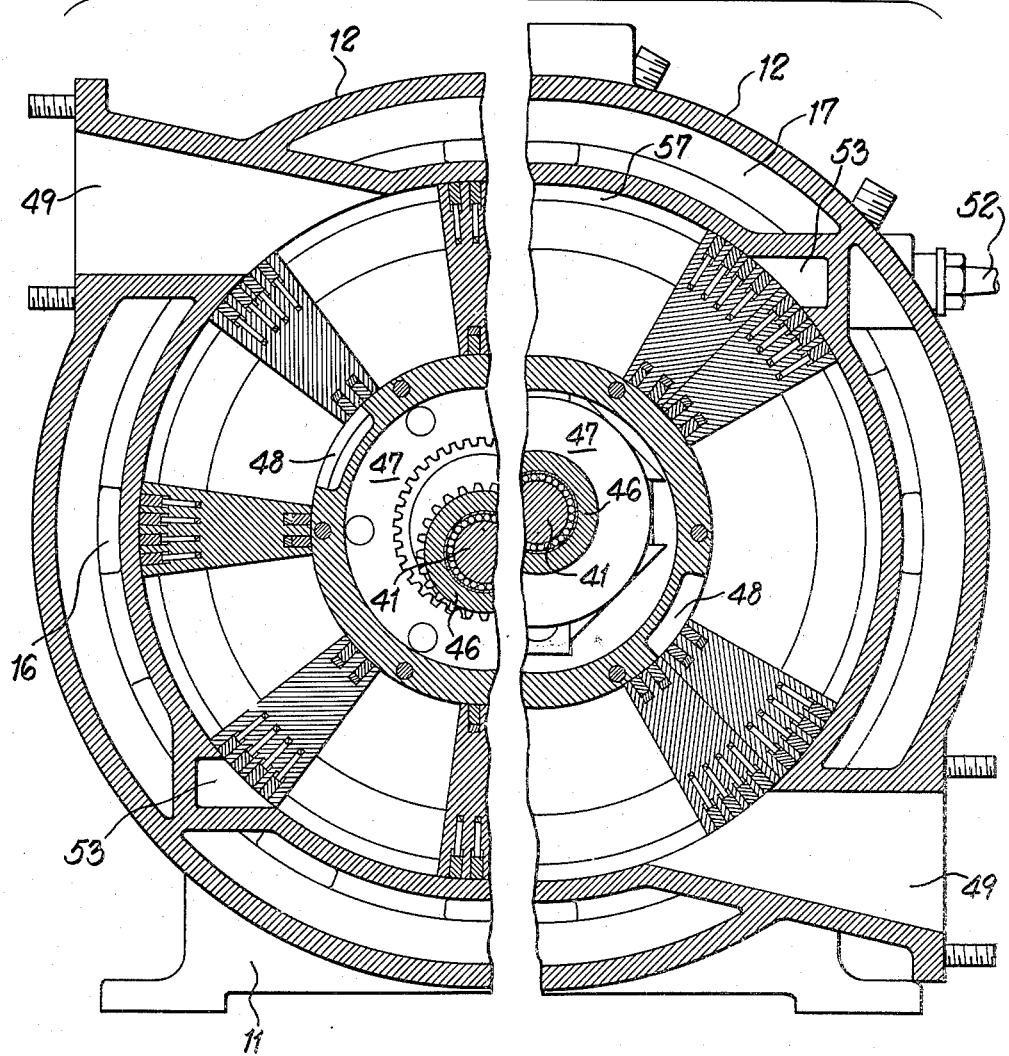
Figure 5 is a composite of Figures 3 and 4 but modified to show true cross sections and illustrating an embodiment utilizing common firing chambers and slightly different shaped piston vanes which are preferred with common firing chambers.

The crankpins 41 and 41a of the crankshaft 26 have rotatively mounted thereon a connecting member 43 and 43a. The connecting members 43 and 43a are each provided with four radial slots 44, with a pillow block 45 being slidably received in each slot 44. Each pillow block 45 engages one of the crankpins 40 on one of the driving rings 38. It can therefore be seen that each driving ring is connected to both connecting members 43 by means of the crankpins 40 on each driving ring. Each driving ring is constructed in such manner as to have cut-away portions in order to permit the individual angular motion required of each driving ring relative to the others. One such cut-away portion is illustrated in Figure 3 for driving ring 39a.

The two connecting members 43 are each provided with an integral spur gear 46. These spur gears 46 engage stationary ring gears 47 which are assembled to the extension 29 of the stator end plates 13.

The individual piston sets in the left and right hand chambers rotate together as a unit. In addition, they have a limited rotary movement relative to each other. Each piston set in each ring chamber alternately accelerates and decelerates so that the rate of travel of alternate sets of pistons varies in such a way that the distance between adjoining vanes of each piston set varies from a maximum to a minimum during the rotation of the engine.

The intake manifolds 20 in the end sections 13 are connected to ports 48 which serve to interconnect each ring chamber with the intake manifolds. Fluid is drawn into each ring chamber from the intake manifolds through ports 48 as adjacent vanes of the piston sets draw apart. The ports 48 therefore serve as the intake ports for the engine.

Each ring chamber is connected to the exhaust system by ports 49 provided in the annular central stator section 12 to permit scavenging of the exhaust gases as adjacent vanes of the piston sets move together during the scavenging stroke. The intake ports 48 and the exhaust ports 49 are located at diametrically opposite points in the ring chambers and are located in such a manner so as to coincide with the previously described relative movement of the piston sets.

Since there are two piston sets in each ring chamber and each piston set is provided with four piston vanes there are eight piston vanes in each ring chamber. When adjacent vanes of these piston sets are at their closest proximity there will be four contracted chambers 50 between adjacent piston vanes and the wall of each ring chamber. Two diametrically opposed contracted chambers 50 will be adjacent the input ports 48 and output ports 49. The other two diametrically opposed contracted chambers 50 will be adjacent firing chambers 51. Each firing chamber 51 has mounted therein a spark plug 52 or other suitable ignition means. If desired, similarly located firing chambers 51 in each ring chamber may be connected together, such for example as by passage 53, when common combustion chambers are employed.

In order for the engine of the present invention to function properly it is important to provide adequate seals to prevent escape of gas from or into the ring chambers. For this purpose a labyrinth construction is provided between the inner face of annular rings 30 and 30a, which are connected to the extensions 29 and 29a of end plates 13, and the adjacent faces of driving rings 39 and 39a. This construction is such that centrifugal force tends to trap oil at the outer periphery of these sections and thereby provides a positive oil trap or seal against such leakage. A similar construction is provided between driving ring 39 and side wall 35 and between driving ring 39a and side wall 35a. These latter parts are assembled together and the construction is such so that oil under the influence of centrifugal force will be trapped at the outer periphery of driving rings 39 and 39a to prevent leakage of gas from one ring chamber into the other between these parts.

In order to prevent leakage of gas between driving rings 38 and 38a a combination seal and thrust ring 54 is provided between these parts. In addition compression rings 55 and a spacing ring 56 are provided at the outer periphery of driving rings 38 and 38a. The rings 55 and 56 are centrally located in the bore of the annular central section 12 of the stator 10.

It is to be noted that during the operation of the engine of the present invention pressure tends to build up between the end plates 13 and the left hand side walls 35 and 37 and between the right hand side walls 35a and 37a, and also between the driving rings 38 and 38a. Since the areas of driving rings 38 and 38a above the thrust ring 54 are slightly less than the areas of left hand side walls 35 and 37 there is a slight longitudinal movement of the piston sets in the left hand ring chamber. This results in a slight longitudinal thrust on the combination seal and thrust ring 54 which increases the effectiveness of this seal.

The leakage of gas between the inner bore of annular central section 12 and the outside perimeter of side walls 35 and 37 is prevented by compression rings 57. These compression rings 57, as illustrated in Figure 1, are mounted between the side walls 35 and 37 and the inner bore of the central section 12.

In order to prevent leakage of gas across the pistons, the inner and outer periphery of each vane piston, as well as the side of each vane piston adjacent the inner side wall of the other piston set in the ring chamber, are provided with spring loaded packings 58. Additionally, the individual piston sets in each ring chamber are biased by minor variations in the surface area of the inner and outer side walls of each piston set. In this manner there is a slight longitudinal thrust created which will keep the piston vanes rubbing against adjacent side walls at those points where packing has not been provided. This thrust will be proportional to the pressure between the vanes in each ring chamber and is proportional to the fluid pressure in these chambers.

The operation of the engine of the present invention is as follows. As crankshaft 26 rotates, the individual piston sets in each ring chamber will alternately accelerate and decelerate. Thus, individual piston sets will stop rotating when the driving crankpins 40 associated with the piston sets line up with the engaged teeth of stationary ring gears 47 and spur gears 46 of the connecting members 43. When the crankpins 40 move away from alignment with the engagement of ring gears 47 and spur gears 46 the associated piston sets will speed up. It will be noted from the drawings that the points at which the piston sets stop rotating occur on lines 45 degrees from vertical and that the pistons approach maximum velocity as they approach vertical and horizontal positions. As a result of this interaction between the crankshaft 26 and gear members 46 and 47, the connecting members 43 and associated piston sets 31 and 32 rotate relative to the stator 10 in a direction opposite to that of the crankshaft 26, the piston sets rotating at an average speed of one-third that of the crankshaft. There will therefore be two and two-third complete expansions and contractions of each working chamber 50 for each revolution of the crankshaft.

The eight working chambers 50 in the ring chambers provide diametrically opposed intake, compression, firing and scavenging strokes at all times. This action of the working chambers conforms to a conventional four stroke cycle engine and provides sixteen overlapping power strokes for each three revolutions of the crankshaft.

Where common firing chambers are used as described above fresh changes will alternately be supplied to each combustion chamber, first from the left piston chamber and then from the right piston chamber so that gas will move alternately from left to right and from right to left in the common firing chambers. This provides for adequate turbulence and avoids extreme pressure fluctuations such as occur in the firing chambers of more conventional forms of engines. It will be apparent that a part of the burnt charge will alternately escape from the common firing chambers first from one side and then from the other side as piston vanes are pushed forward by the gas pressure maintained in these firing chambers.

It will be noted that due to the location of the intake ports 48 in the inner periphery of the ring chambers and the rotary motion of the piston vanes 31 and 32 as they pass these ports centrifugal force will aid in drawing the charge into each chamber. The effect of this centrifugal assistance will increase as the speed of rotation of the engine increases thereby in effect increasing the effective displacement of the engine for each crankshaft rotation as the speed of the engine is increased. This action consequently increases the compression ratio of the engine as its speed increases which is a desirable feature in internal combustion operation.

The illustrated engine may be used either with a carburetor and spark plugs for use with a highly volatile fuel such as gasoline, or without a carburetor and using solid fuel injectors in which case ignition is effected by the high compression thereby permitting the use of fuel of lower volatility such for example as diesel oil. In the latter case, spark ignition or glow plug ignition may also be used.

It is to be understood that although the rotary engine of the present invention has been described with reference to the specific structure illustrated, additions and modifications may be made thereto without departing from the present invention except as limited by the scope of the following claims.

I claim:

1. A rotary piston engine comprising a crankshaft, means to define an annular enclosure effectively divided into two substantially identical rotary piston chambers each of which coaxially surrounds said crankshaft at axially spaced positions thereon, a like plurality of rotary piston assemblies of the accelerating and decelerating type rotatably movable within each chamber and operatively coupled to said crankshaft, each assembly being constituted by four piston elements fixedly mounted relative to each other at equally spaced positions within the associated chamber and rotatable about the shaft therein, inlet ports in each of said chambers for introducing a fluid therein, ignition means in each of said chambers for expanding said fluid introduced therein, outlet ports in each of said chambers for expulsion of said expanded fluid from said chambers, said inlet ports being positioned at the inner periphery of said chambers and said outlet ports being positioned at the outer periphery of said chambers whereby the motion of said pistons in said chambers aids in drawing fluid into said chambers, and drive means interconnecting the pistons in the respective chambers with said crankshaft whereby the piston assemblies in each chamber are driven from common driving means.

2. A rotary piston engine in accordance with claim 1 wherein two inlet ports, two outlet ports and two firing chambers are provided in each of said chambers at diametrically opposed positions therein.

3. A rotary piston engine in accordance with claim 2 wherein corresponding firing chambers in each of said ring chambers are interconnected whereby said ring chambers are provided with common firing chambers.

4. A rotary piston engine comprising a crankshaft, means to define an annular enclosure effectively divided into two substantially identical rotary piston chambers each of which coaxially surrounds said crankshaft at axially spaced positions thereon, a like plurality of rotary piston assemblies of the accelerating and decelerating type rotatably movable within each chamber and operatively coupled to said crankshaft, each assembly being constituted by four piston elements fixedly mounted relative to each other at equally spaced positions within the associated chamber and rotatable about the shaft therein, inlet ports in each of said chambers for introducing a fluid therein at points situated between adjacent pistons of different assemblies one which is moving at a greater velocity than the other thereof thereby causing compression of said introduced fluid, the inlet ports in each of said chambers being located at diametrically opposed positions therein, ignition means in each of said chambers for expanding said fluid introduced therein to produce a force accelerating said other piston, the ignition means in each of said chambers being located at diametrically opposed positions therein, outlet ports in each of said chambers in advance of said accelerating pistons for expulsion of said expanded fluid from said chambers, the outlet ports in each of said chambers being located at diametrically opposed positions therein, and means coordinately interconnecting the pistons in the respective chambers with said crankshaft whereby the piston assemblies in each chamber operate in alternate cycles to provide overlapping power strokes.

5. A rotary piston engine comprising a crankshaft, means to define an annular enclosure effectively divided into two substantially identical rotary piston chambers each of which coaxially surrounds said crankshaft at axially spaced positions thereon, a like plurality of rotary piston assemblies of the accelerating and decelerating type rotatably movable within each chamber and operatively coupled to said crankshaft, each assembly being constituted by four piston elements fixedly mounted relative to each other at equally spaced positions within the associated chamber and rotatable about the shaft therein, means for introducing a fluid into each of said chambers at points therein situated between adjacent pistons of different assemblies one of which is moving at a greater velocity than the other thereof thereby causing compression of said introduced fluid, ignition means in each of said chambers for expanding said fluid introduced therein to produce a force accelerating said other piston, outlet ports in each of said chambers in advance of said accelerating pistons for expulsion of said expanded fluid from said chambers, means to prevent leakage of fluid from said chambers, sealing means on each of said pistons to prevent leakage of fluid across said pistons, and means coordinately interconnecting the pistons in the respective chambers with said crankshaft whereby the piston assemblies in each chamber operate in alternate cycles to provide overlapping power strokes.

6. A rotary piston engine comprising a crankshaft, means to define an annular enclosure effectively divided into two substantially identical rotary piston chambers each of which coaxially surrounds said crankshaft at axially spaced positions thereon, a like plurality of rotary piston assemblies of the accelerating and decelerating type rotatably movable within each chamber and operatively coupled to said crankshaft, each assembly being constituted by four piston elements fixedly mounted relative to each other at equally spaced positions within the associated chamber and rotatable about the shaft therein, each of said pistons having associated therewith segmental side walls to define end enclosures for the associated chamber, the two end enclosures of each of said chambers having substantially the same area whereby the end pressures on each of said chambers is substantially balanced, means for introducing a fluid into each of said chambers at points therein situated between adjacent pistons of different assemblies one of which is moving at a greater velocity than the other thereof thereby causing compression of said introduced fluid, ignition means in each of said chambers for expanding said fluid introduced therein to produce a force accelerating said other piston, outlet ports in each of said chambers in advance of said accelerating pistons for expulsion of said expanded fluid from said chambers, and means coordinately interconnecting the pistons in the respective chambers with said crankshaft whereby the piston assemblies in each chamber operate in alternate cycles to provide overlapping power strokes.

7. A rotary piston engine comprising a crankshaft, means to define an annular enclosure effectively divided into two substantially identical rotary piston chambers each of which coaxially surrounds said crankshaft at axially spaced positions thereon, a like plurality of rotary piston assemblies of the accelerating and decelerating type rotatably movable within each chamber and operatively coupled to said crankshaft, each assembly being constituted by four piston elements fixedly mounted relative to each other at equally spaced positions within the associated chamber and rotatable about the shaft therein, two inlet ports in each of said chambers for introducing a fluid therein at points situated between adjacent pistons of different assemblies one of which is moving at a greater velocity than the other thereof thereby causing compression of said introduced fluid, said inlet ports in each chamber being located at diametrically opposed positions therein, two firing chambers in each of said chambers for expanding said fluid introduced therein to produce a force accelerating said other piston, said firing chambers in each chamber being located at diametrically opposed positions therein, two outlet ports in each of said chambers in advance of said accelerating pistons for expulsion of said expanded fluid from said chambers, said outlet ports in each chamber being located at diametrically opposed positions therein, and means coordinately interconnecting the pistons in the respective chambers with said crankshaft whereby the piston assemblies in each chamber operate in alternate cycles to provide overlapping power strokes, the pistons in one chamber being at their closest proximity when the pistons in the other chamber are spaced equally apart.

8. A rotary piston engine comprising a crankshaft, means to define an annular enclosure effectively divided into two substantially identical rotary piston chambers each of which coaxially surrounds said crankshaft at axially spaced positions thereon, a like plurality of rotary piston assemblies of the accelerating and decelerating type rotatably movable within each chamber and operatively coupled to said crankshaft, each assembly being constituted by four piston elements fixedly mounted relative to each other at equally spaced positions within the associated chamber and rotatable about the shaft therein, two inlet ports in each of said chambers for introducing a fluid therein at points situated between adjacent pistons of different assemblies one of which is moving at a greater velocity than the other thereof thereby causing compression of said introduced fluid, said inlet ports in each chamber being located at diametrically opposed positions therein, two firing chambers in each of said chambers for expanding said fluid introduced therein to produce a force accelerating said other piston, said firing chambers in each chamber being located at diametrically opposed positions therein, two outlet ports in each of said chambers in advance of said accelerating pistons for expulsion of said expanded fluid from said chambers, said outlet ports in each chamber being located at diametrically opposed positions therein, corresponding firing chambers in each of said rotary piston chambers being interconnected whereby said rotary piston chambers are provided with common firing chambers, and means coordinately interconnecting the pistons in the respective chambers with said crankshaft whereby the piston assemblies in each chamber operate in alternate cycles to provide overlapping power strokes, the pistons in one chamber being at their closest proximity when the pistons in the other chambers are spaced equally apart.

9. A rotary piston engine comprising a crankshaft, means to define an annular enclosure effectively divided into two substantially identical rotary piston chambers each of which coaxially surrounds said crankshaft at axially spaced positions thereon, a pair of rotary piston assemblies of the accelerating and decelerating type rotatably movable within each chamber and operatively coupled to said crankshaft, each assembly being constituted by four piston elements fixedly mounted relative to each other at equally spaced positions within the associated chamber and rotatable about the shaft therein, two diametrically opposed radial inlet ports in each of said chambers for introducing a fluid therein at points situated between adjacent pistons of different assemblies one of which is moving at a greater velocity than the other thereof thereby causing compression of said introduced fluid, two diametrically opposed ignition chambers in each of said chambers for expanding said fluid introduced therein to produce a force accelerating said other piston, two diametrically opposed outlet ports in each of said chambers in advance of said accelerating pistons for expulsion of said expanded fluid from said chambers, and means coordinately interconnecting the pistons in the respective chambers with said crankshaft whereby the piston assemblies in each chamber operate in alternate cycles to provide overlapping power strokes.

10. A rotary piston engine comprising a crankshaft, means to define an annular enclosure effectively divided into two substantially identical rotary piston chambers each of which coaxially surrounds said crankshaft at axially spaced positions thereon, a pair of rotary piston assemblies of the accelerating and decelerating type rotatably movable within each chamber and operatively coupled to said crankshaft, each assembly being constituted by four piston elements fixedly mounted relatively to each other at equally spaced positions within the associated chamber and rotatable about the shaft therein, four driving rings rotatably movable within said casing between said chambers, the pistons of each of said piston assemblies being connected to one of said driving rings, two diametrically opposed radial inlet ports in each of said chambers for introducing a fluid therein at points situated between adjacent pistons of different assemblies one of which is moving at a greater velocity than the other thereof thereby causing compression of said introduced fluid, two diametrically opposed ignition chambers in each of said chambers for expanding said fluid introduced therein to produce a force accelerating said other piston, two diametrically opposed outlet ports in each of said chambers in advance of said accelerating pistons for expulsion of said expanded fluid from said chambers, and means coordinately interconnecting the pistons in the respective chambers with said crankshaft whereby the piston assemblies in each chamber operate in alternate cycles to provide overlapping power strokes.

11. A rotary piston engine comprising, a double throw crankshaft having diametrically opposed crankpins, means to define an annular enclosure effectively divided into two substantially identical rotary piston chambers each of which coaxially surrounds said crankshaft at axially spaced positions thereon, each of said chambers encircling one of the crankpins of said crankshaft, a pair of rotary piston assemblies of the accelerating and decelerating type rotatably movable within each chamber and operatively coupled to said crankshaft, each assembly being constituted by four piston elements fixedly mounted relative to each other at equally spaced positions within the associated chamber and rotatable about the shaft surrounded thereby, four driving rings rotatably movable between said chambers, the pistons of each of said piston assemblies being connected to one of said driving rings, a connecting member rotatively mounted on each of said crankpins, each of said driving rings being connected to both of said connecting members, two diametrically opposed radial inlet ports in each of said chambers for introducing a fluid therein at points situated between adjacent pistons of different assemblies one of which is moving at a greater velocity than the other thereof thereby causing compression of said introduced fluid, two diametrically opposed ignition chambers in each of said chambers for expanding said fluid introduced therein to produce a force accelerating said other piston, two diametrically opposed outlet ports in each of said chambers in advance of said accelerating pistons for expulsion of said expanded fluid from said chambers, and means periodically locking said connecting members to said casing whereby the piston assemblies in each chamber operate in alternate cycles to provide overlapping power strokes, the pistons in one chamber being at their closest proximity when the pistons in the other chamber are spaced equally apart.

12. A rotary piston engine comprising a double throw crankshaft having diametrically opposed crankpins, means to define an annular enclosure therebetween, said annular enclosure being effectively divided into two substantially identical rotary piston chambers each of which coaxially surrounds said crankshaft at axially spaced positions thereon, each of said chambers encircling one of the crankpins of said crankshaft, a pair of rotary piston assemblies of the accelerating and decelerating type rotatably movable within each chamber and operatively coupled to said crankshaft, each assembly being constituted by four piston elements fixedly mounted relative to each other at equally spaced positions within the associated chamber and rotatable about the shaft surrounded thereby, four driving rings rotatably movable between said chambers, the pistons of each of said piston assemblies being connected to one of said driving rings, two pins on each of said driving rings, said pins being positioned on opposite sides of each of said driving rings at diametrically opposed positions thereon, a connecting member rotatively mounted on each of said crankpins, each of said connecting members having four radial slots at equally spaced positions thereon, a pillow block slidably movable in each of said slots, the pins on each of said driving rings engaging one pillow block in each of said connecting members whereby each driving ring is connected to both of said connecting members, two diametrically opposed radial inlet ports in each of said chambers for introducing a fluid therein at points situated between adjacent pistons of different assemblies one of which is moving at a greater velocity than the other thereof thereby causing compression of said introduced fluid, two diametrically opposed ignition chambers in each of said chambers for expanding said fluid introduced therein to produce a force accelerating said other piston, two diametrically opposed outlet ports in each of said chambers in advance of said accelerating pistons for expulsion of said expanded fluid from said chambers, and means periodically locking said connecting members to said casing whereby the piston assemblies in each chamber operate in alternate cycles to provide overlapping power strokes, the pistons in one chamber being at their closest proximity when the pistons in the other chamber are spaced equally apart.

13. A rotary piston engine comprising a double throw crankshaft having diametrically opposed crankpins, means to define an annular enclosure effectively divided into two substantially identical rotary piston chambers each of which surrounds said crankshaft at axially spaced positions thereon and has positioned, each of said chambers encircling one of the crankpins of said crankshaft, a pair of rotary piston assemblies of the accelerating and decelerating type rotatably movable within each chamber and operatively coupled to said crankshaft, each assembly being constituted by four piston elements fixedly mounted relative to each other at equally spaced positions within the associated chamber and rotatable about the shaft surrounded thereby, four driving rings rotatably movable between said chambers, the pistons of each of said piston assemblies being connected to one of said driving rings, two pins on each of said driving rings, said pins being positioned on opposite sides of each of said driving rings at diametrically opposed positions thereon, a connecting member rotatively mounted on each of said crankpins, each of said connecting members having four radial slots at equally spaced positions thereon, a pillow block slidably movable in each of said slots, the pins on each of said driving rings engaging one pillow block in each of said connecting members whereby each driving ring is connected to both of said connecting members, a spur gear on each of said connecting members, a stationary ring gear in each of said chambers adapted periodically to engage said spur gears whereby the piston assemblies in each of said chambers alternately accelerate and decelerate to provide overlapping power strokes, the pistons in one chamber being at their closest proximity when the pistons in the other chamber are spaced equally apart, two diametrically opposed radial inlet ports in each of said chambers for introducing a fluid therein at points situated between adjacent pistons of different assemblies one of which is moving at a greater velocity than the other thereof thereby causing compression of said introduced fluid, two diametrically opposed ignition chambers in each of said chambers for expanding said fluid introduced therein to produce a force accelerating said other piston, and two diametrically opposed outlet ports in each of said chambers in advance of said accelerating pistons for expulsion of said expanded fluid from said chambers.

14. A rotary piston engine comprising a double throw crankshaft having diametrically opposed crankpins, means to define an annular enclosure effectively divided into two substantially identical rotary piston chambers each of which surrounds said crankshaft at axially spaced positions thereon, each of said chambers encircling one of the crankpins of said crankshaft, a pair of rotary piston assemblies of the accelerating and decelerating type rotatably movable within each chamber and operatively coupled to said crankshaft, each assembly being constituted by four piston elements fixedly mounted relative to each other at equally spaced positions within the associated chamber and rotatable about the shaft surrounded thereby, each of said pistons having associated therewith segmental side walls to define end enclosures for the associated chamber, the two end enclosures of each of said chambers having substantially the same area whereby the end pressures on each of said chambers is substantially balanced, four driving rings rotatably movable between said chambers, the pistons of each of said piston assemblies being connected to one of said driving rings, two pins on each of said driving rings, said pins being positioned on opposite sides of each of said driving rings at diametrically opposed positions thereon, a connecting member rotatively mounted on each of said crankpins, each of said connecting members having four radial slots at equally spaced positions thereon, a pillow block slidably movable in each of said slots, the pins on each of said driving rings engaging one pillow block in each of said connecting members whereby each driving ring is connected to both of said connecting members, a spur gear on each of said connecting members, a stationary ring gear in each of said chambers adapted periodically to engage said spur gears whereby the piston assemblies in each of said chambers alternately accelerate and decelerate to provide overlapping power strokes, the pistons in one chamber being at their closest proximity when the pistons in the other chamber are spaced equally apart, two diametrically opposed radial inlet ports in each of said chambers for introducing a fluid therein at points situated between adjacent pistons of different assemblies one of which is moving at a greater velocity than the other thereof thereby causing compression of said introduced fluid, two diametrically opposed ignition chambers in each of said chambers for expanding said fluid introduced therein to produce a force accelerating said other piston, and two diametrically opposed outlet ports in each of said chambers in advance of said accelerating pistons for expulsion of said expanded fluid from said chambers.

15. A rotary piston engine comprising a double throw crankshaft having diametrically opposed crankpins, means to define an annular enclosure effectively divided into two substantially identical rotary piston chambers each of which surrounds said crankshaft at axially spaced positions thereon, each of said chambers encircling one of the crankpins of said crankshaft, a pair of rotary piston assemblies of the accelerating and decelerating type rotatably movable within each chamber and operatively coupled to said crankshaft, each assembly being constituted by four piston elements fixedly mounted relative to each other at equally spaced positions within the associated chamber and rotatable about the shaft surrounded thereby, each of said pistons having associated therewith segmental side walls to define end enclosures for the associated chamber, the two end enclosures of each of said chambers having substantially the same area whereby the end pressures on each of said chambers is substantially balanced, four driving rings rotatably movable between said chambers, the pistons of each of said piston assemblies being connected to one of said driving rings, sealing means between said side walls and said driving rings to prevent leakage of fluid between said chambers, two pins on each of said driving rings, said pins being positioned on opposite sides of each of said driving rings at diametrically opposed positions thereon, a connecting member rotatively mounted on each of said crankpins, each of said connecting members having four radial slots at equally spaced positions thereon, a pillow block slidably movable in each of said slots, the pins on each of said driving rings engaging one pillow block in each of said connecting members whereby each driving ring is connected to both of said connecting members, a spur gear on each of said connecting members, a stationary ring gear in each of said chambers adapted periodically to engage said spur gears whereby the piston assemblies in each of said chambers alternately accelerate and decelerate to provide overlapping power strokes, the pistons in one chamber being at their closest proximity when the pistons in the other chamber are spaced equally apart, two diametrically opposed radial inlet ports in each of said chambers for introducing a fluid therein at points situated between adjacent pistons of different assemblies one of which is moving at a greater velocity than the other thereof thereby causing compression of said introduced fluid, two diametrically opposed ignition chambers in each of said chambers for expanding said fluid introduced therein to produce a force accelerating said other piston, and two diametrically opposed outlet ports in each of said chambers in advance of said accelerating pistons for expulsion of said expanded fluid from said chambers.

16. A rotary piston engine comprising a double throw crankshaft having diametrically opposed crankpins, means to define an annular enclosure effectively divided into two substantially identical rotary piston chambers each of which surrounds said crankshaft at axially spaced positions thereon, each of said chambers encircling one of the crankpins of said crankshaft, a pair of rotary piston assemblies of the accelerating and decelerating type rotatably movable within each chamber and operatively coupled to said crankshaft, each assembly being constituted by four piston elements fixedly mounted relative to each other at equally spaced positions within the associated chamber and rotatable about the shaft therein, each of said pistons having associated therewith segmental side walls to define end enclosures for the associated chamber, the two end enclosures of each of said chambers having substantially the same area whereby the end pressures on each of said chambers is substantially balanced, four driving rings rotatably movable between said chambers, sealing means between said side walls and said driving rings to prevent leakage of fluid between said chambers, said driving rings having sealing means associated therewith to prevent leakage of fluid between said driving rings, the pistons of each of said piston assemblies being connected to one of said driving rings, two pins on each of said driving rings, said pins being positioned on opposite sides of each of said driving rings at diametrically opposed positions thereon, a connecting member rotatively mounted on each of said crankpins, each of said connecting members having four radial slots at equally spaced positions thereon, a pillow block slidably movable in each of said slots, the pins on each of said driving rings engaging one pillow block in each of said connecting members whereby each driving ring is connected to both of said connecting members, a spur gear on each of said connecting members, a stationary ring gear in each of said chambers adapted periodically to engage said spur gears whereby the piston assemblies in each of said chambers alternately accelerate and decelerate to provide overlapping power strokes, the pistons in one chamber being at their closest proximity when the pistons in the other chamber are spaced aqually apart, two diametrically opposed radial inlet ports in each of said chambers for introducing a fluid therein at points situated between adjacent pistons of different assemblies one of which is moving at a greater velocity than the other thereof thereby causing compression of said introduced fluid, two diametrically opposed ignition chambers in each of said chambers for expanding said fluid introduced therein to produce a force accelerating said other piston, and two diametrically opposed outlet ports in each of said chambers in advance of said accelerating pistons for expulsion of said expanded fluid from said chambers.

17. A rotary piston engine comprising a double throw crankshaft having diametrically opposed crankpins, means to define an annular enclosure effectively divided into two substantially identical rotary piston chambers each of which surrounds said crankshaft at axially spaced positions thereon, each of said chambers encircling one of the crankpins of said crankshaft, a pair of rotary piston assemblies of the accelerating and decelerating type rotatably movable within each chamber and operatively coupled to said crankshaft, each assembly being constituted by four piston elements fixedly mounted relative to each other at equally spaced positions within the associated chamber and rotatable about the shaft therein, each of said pistons having associated therewith segmental side walls to define end enclosures for the associated chamber, the two end enclosures of each of said chambers having substantially the same area whereby the end pressures on each of said chambers is substantially balanced, four driving rings rotatably movable between said chambers, sealing means between said side walls and said driving rings to prevent leakage of fluid between said chambers, said driving rings having sealing means associated therewith to prevent leakage of fluid between said driving rings, each of said pistons having sealing means associated therewith to prevent leakage of fluid across said pistons, the pistons of each of said piston assemblies being connected to one of said driving rings, two pins on each of said driving rings, said pins being positioned on opposite sides of each of said driving rings at diametrically opposed positions thereon, a connecting member rotatively mounted on each of said crankpins, each of said connecting members having four radial slots at equally spaced positions thereon, a pillow block slidably movable in each of said slots, the pins on each of said driving rings engaging one pillow block in each of said connecting members whereby each driving ring is connected to both of said connecting members, a spur gear on each of said connecting members, a stationary ring gear for each said spur gears whereby the piston assemblies in each of said chambers alternately accelerate and decelerate to provide overlapping power strokes, the pistons in one chamber being at their closest proximity when the pistons in the other chamber are spaced equally apart, two diametrically opposed radial inlet ports in each of said chambers for introducing a fluid therein at points situated between adjacent pistons of different assemblies one of which is moving at a greater velocity than the other thereof thereby causing compression of said introduced fluid, two diametrically opposed ignition chambers in each of said chambers for expanding said fluid introduced therein to produce a force accelerating said other piston, and two diametrically opposed outlet ports in each of said chambers in advance of said accelerating pistons for expulsion of said expanded fluid from said chambers.

18. A rotary piston engine in accordance with claim 17 wherein corresponding firing chambers in each of said ring chambers are interconnected whereby said ring chambers are provided with common firing chambers.

References Cited in the file of this patent

UNITED STATES PATENTS

| | | |
|---|---|---|
| 2,271,068 | Gardner | Jan. 27, 1942 |
| 2,304,406 | Griffith | Dec. 8, 1942 |
| 2,367,676 | Griffith | Jan. 23, 1945 |
| 2,736,328 | Mallinckrodt | Feb. 28, 1956 |
| 2,756,728 | Mallinckrodt | July 31, 1956 |
| 2,899,944 | Patkau | Aug. 18, 1959 |